United States Patent [19]

Asano

[11] Patent Number: 4,703,215
[45] Date of Patent: Oct. 27, 1987

[54] STACKED PIEZOELECTRIC CERAMICS DISPLACEMENT MAGNIFYING DEVICE

[75] Inventor: Hitoshi Asano, Obu, Japan

[73] Assignee: Aisan Kogyo Kabushiki Kaisha, Obu, Japan

[21] Appl. No.: 10,737

[22] Filed: Feb. 4, 1987

[30] Foreign Application Priority Data

Mar. 13, 1986 [JP] Japan ............................ 61-036641[U]

[51] Int. Cl.⁴ ............................................ H01L 41/08
[52] U.S. Cl. ...................................................... 310/328
[58] Field of Search ......................... 310/321, 323, 328

[56] References Cited

U.S. PATENT DOCUMENTS

| | | | |
|---|---|---|---|
| 4,435,666 | 3/1984 | Fukui et al. | 310/328 |
| 4,518,887 | 5/1985 | Yano et al. | 310/328 |
| 4,547,086 | 10/1985 | Matsumoto et al. | 310/328 X |
| 4,570,095 | 2/1986 | Uchikawa | 310/328 |
| 4,613,782 | 9/1986 | Mori et al. | 310/328 X |
| 4,633,118 | 12/1986 | Kosugi | 310/328 |

*Primary Examiner*—Mark O. Budd
*Attorney, Agent, or Firm*—Dennison, Meserole, Pollack & Scheiner

[57] ABSTRACT

A stacked piezoelectric ceramics displacement magnifying device comprising a base member; a stacked piezoelectric ceramics fixed at its one end to the base member, the stacked piezoelectric ceramics being expandable upon application of an electric field thereto; a lever member having an inner end portion for receiving an expansion force from the stacked piezoelectric ceramics, at least two outer end portions adapted to be outwardly displaced when the inner end portion receives the expansion force from the stacked piezoelectric ceramics, and a fulcrum portion connected through a hinge to the base member, the hinge being formed of a thin plate unexpandable in its longitudinal direction; a connection member for connecting the other end of the stacked piezoelectric ceramics to the inner end portion of the lever member; and a flexing member formed of an elongated elastic material and connected at its both ends to the outer end portions of the lever member under the condition where a central portion thereof is flexed. The hinge is arranged in parallel to a direction of a resultant of forces acting to the inner end portion and the outer end portion of the lever member.

6 Claims, 4 Drawing Figures

STACKED PIEZOELECTRIC CERAMICS DISPLACEMENT MAGNIFYING DEVICE

BACKGROUND OF THE INVENTION

The present invention relates to a stacked piezoelectric ceramics displacement magnifying device (which will be hereinafter also referred to as a piezoelectric actuator).

The stacked piezoelectric cermics is constituted of a plurality of stacked ceramics elements displaceable upon application of an electric field thereto. The amount of displacement (distorsion) of the stacked ceramics elements varies with the strength of electric field. As the product of the displacement and a force generated is relatively large, and responsiveness is remarkably high, the stacked piezoelectric ceramics is used as a high-responsive actuator in various fields.

However, the amount of displacement of the stacked piezoelectric ceramics is small, and therefore, an actuator having the stacked piezoelectric ceramics combined with a displacement manifying device is being developed. Such a piezoelectric actuator is disclosed in Japanese Patent Laid-Open Publication No. 60-81568, for example.

Referring to FIG. 3 which shows the conventional piezoelectric actuator, a flexing member 1 is formed of an elongated elastic material which is easily flexible in a horizontal direction shown, but is hardly expandable in a vertical direction shown. The flexing member 1 is connected at its both ends to upper end portions 2c of a lever arm 2 under a preliminarily flexed condition as shown. Lower end portions 2b of the lever arm 2 is connected through hinges 3 to fulcrum portions 4a of a base member 4. The hinges 3 are formed of a sheet material which is hardly expandable in a longitudinal direction thereof. In this example, the hinges 3 are formed integrally with the lever arm 2 and the base member 4. A stacked piezoelectric ceramics 5 is fixed at its upper end to the base member 4, and is connected at its lower end through hinges 6 to lower end portions 2a of the lever arm 2. The hinges 6 are formed of a sheet material similar to the hinges 3. Upon application of a voltage to the stacked piezoelectric ceramics 5, the lower ends of the ceramics 5 are displaced downwardly to rotate the lever arm 2 about the hinges 3. Accordingly, the upper end portions 2c of the lever arm 2 are displaced in the longitudinal direction of the flexing member 1 to deform the flexed central portion of the flexing member 1 into a straight condition. Thus, the amount of displacement of the stacked piezoelectric ceramics 5 may be magnified.

In operation, forces are applied to the lower end portions 2a and the upper end portions 2c of the lever arm 2 as depicted by vectors A' and C'. The product of the vectors A' and C' is shown by a vector B' in FIG. 4, which is applied to the fulcrum portions 2b. However, the longitudinal direction of the hinges 3 connected to the fulcrum portions 2b is not parallel to the direction of the vector B', and accordingly, a bending force as well as a tensile force is applied to the hinges 3. That is, upon application of an electric field to the piezoelectric ceramics 5, the hinges 3 are bent so that the displacement of the piezoelectric ceramics 5 cannot be sufficiently magnified.

SUMMARY OF THE INVENTION

Accordingly, it is an object of the present invention to provide a stacked piezoelectric ceramics displacement magnifying device which may reliably magnify the displacement of the stacked piezoelectric ceramics.

According to the present invention, there is provided a stacked piezoelectric ceramics displacement magnifying device comprising a base member; a stacked piezoelectric ceramics fixed at its one end to the base member, the stacked piezoelectric ceramics being expandable upon application of an electric field thereto; a lever member having an inner end portion for receiving an expansion force from the stacked piezoelectric ceramics, at least two outer end portions adapted to be outwardly displaced when the inner end portion receives the expansion force from the stacked piezoelectric ceramics, and a fulcrum portion connected through a hinge to the base member, the hinge being formed of a thin plate unexpandable in its longitudinal direction and being arranged in parallel to a direction of a resultant of forces acting to the inner end portion and the outer end portion of the lever member; a connection member for connecting the other end of the stacked piezoelectric ceramics to the inner end portion of the lever member; and a flexing member formed of an elongated elastic material and connected at its both ends to the outer end portions of the lever member under the condition where a central portion thereof is flexed.

The invention will be more fully understood from the following detailed description and appended claims when taken with the drawings.

DETAILED DESCRIPTION OF THE PREFERRED EMBODIMENT

Figure 1:
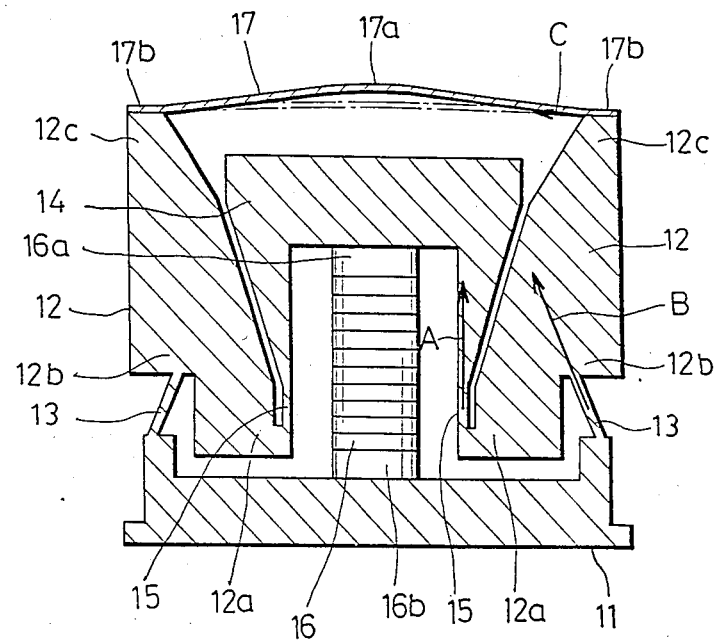
FIG. 1 is a sectional view of the piezoelectric actuator of the present invention.

Referring to FIG. 1 which shows a preferred embodiment of the stacked piezoelectric ceramics displacement magnifying device, a pair of lever members 12 are connected through a pair of hinges 13 to both ends of a base member 11. The hinges 13 are integrally formed with the lever members 12, and are formed of a thin plate unexpandable in its longitudinal direction. Each of the lever members 12 includes an inner end portion 12a for receiving an expansion force from a stacked piezoelectric ceramics 16 to be hereinafter described, a fulcrum portion 12b connected to the hinge 13, and an outer end portion 12c adapted to be outwardly displaced when the inner end portion 12a receives the expansion force. The pair of lever members 12 are arranged in symmetrical relationship with respect to the stacked piezoelectric ceramics 16. A connection member 14 is provided between the pair of lever members 12, and is connected at its both ends through a pair of hinges 15 to the inner end portions 12a of the lever members 12. The hinges 15 are integrally formed with the connection member 14 and the lever members 12. There is defined a space between the base member 11 and the connection member 14, in which space the stacked piezoelectric ceramics 16 is engaged. The stacked piezoelectric ceramics 16 is fixed at its one end 16b to the base member 11, and is connected at the other end 16a to the connection member 14 in such a manner that the stacked piezoelectric ceramics 16 is expandable upwardly as viewed in FIG. 1 upon application of an electric field thereto. A flexing member 17 is fixed at its both ends 17b to the outer end portions 12c of the lever members 12 under the condition where a central portion 17a of the flexing member 17 is flexed outwardly.

Arrangement of the hinges 13 is determined in the following manner. The following discussion is directed to the right-hand part of the displacement mangifying device for the purposes of simplicity of explanation since the same discussion is applicable to the left-hand part.

Figure 2:
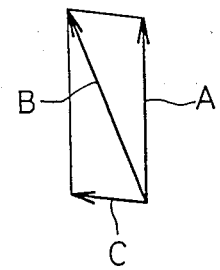
FIG. 2 is a diagram of vectors showing the forces acting to the lever member shown in FIG. 1.
Figure 3:
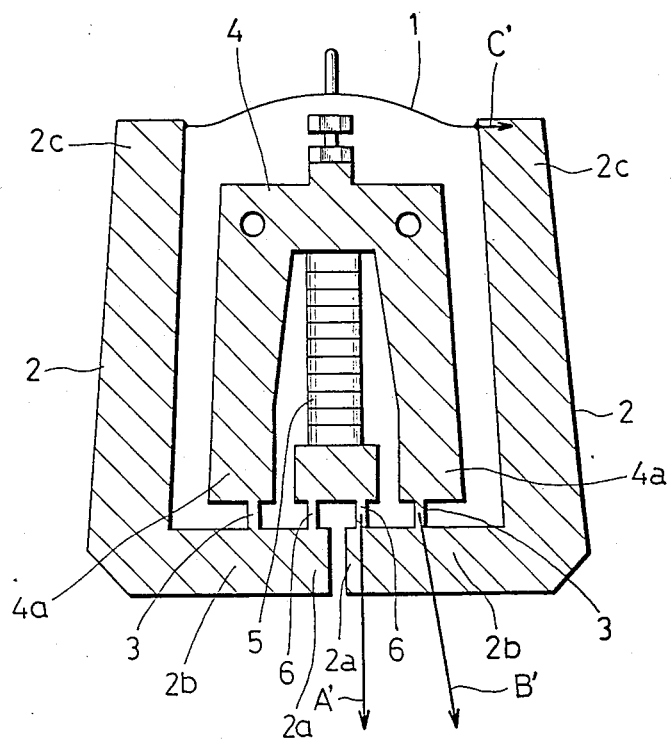
FIG. 3 is a sectional view of the piezoelectric actuator in the prior art.
Figure 4:
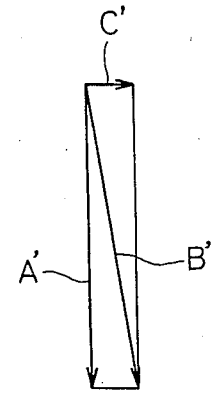
FIG. 4 is a diagram of vectors showing the forces acting to the lever arm shown in FIG. 3.

When an electric field is applied to the stacked piezoelectric ceramics 16, the upper end portion 16a of the ceramics 16 is displaced upwardly as viewed in FIG. 1 to rotate the lever members 12 about the fulcrum portions 12b in opposite directions. At this time, forces acting to the inner end portion 12a and the outer end portion 12c are depicted by vectors A and C, respectively. A resultant of the vectors A and C is depicted by a vector B as shown in FIG. 2. The resultant B acts to the fulcrum portion 12b and the hinge 13. The hinge 13 is arranged in such a manner that its longitudinal direction is substantially parallel to a direction of the vector B so as not to generate bending of the hinge 13 due to the vector B.

In operation, when no electric field is applied to the stacked piezoelectric ceramics 16, the flexing member 17 is upwardly flexed at the central portion 17a as shown by a solid line in FIG. 1. When an electric field is applied to the stacked piezoelectric ceramics 16, the outer end portions 12c of the lever members 12 are outwardly displaced, and accordingly both the ends 17b of the flexing member 17 are also displaced outwardly to move the central portion 17a to a position shown by a dashed line. At this time, an operational member (not shown) connected to the central portion 17a exhibits a given function. Then, upon stoppage of application of the electric field, the piezoelectric ceramics 16 is contracted to return the outer end portions 12c to the original position. Accordingly, the flexing member 17 is upwardly flexed again at its central portion 17a to the original position shown by the solid line.

Under the condition where the electric field is applied to the stacked piezoelectric ceramics 16, the longitudinal direction of the hinge 13 is substantially parallel to the direction of the resultant B of the force A acting to the inner end portion 12a and the force C acting to the outer end portion 12c. Therefore, the resultant B acts only along the longitudinal direction of the hinge 13, and no bending is generated in the hinge 13. Since the hinge 13 is formed of a thin plate unexpandable in its longitudinal direction, it is not deformed in this direction. Consequently, the lever members 12 may reliably magnify the displacement of the stacked piezoelectric ceramics 16.

Having thus described the preferred embodiment of the invention, it should be understood that numerous structural modifications and adaptations may be made without departing from the spirit of the invention.

What is claimed is:

1. A stacked piezoelectric ceramics displacement magnifying device comprising:
    a base member;
    a stacked piezoelectric ceramics fixed at its one end to said base member, said stacked piezoelectric ceramics being expandable upon application of an electric field thereto;
    a lever member having an inner end portion for receiving an expansion force from said stacked piezoelectric ceramics, at least two outer end portions adapted to be outwardly displaced when said inner end portion receives said expansion force from said stacked piezoelectric ceramics, and a fulcrum portion connected through a hinge to said base member, said hinge being formed of a thin plate unexpandable in its longitudinal direction and being arranged in parallel to a direction of a resultant of forces acting to said inner end portion and said outer end portion of said lever member;
    a connection member for connecting the other end of said stacked piezoelectric ceramics to said inner end portion of said lever member; and
    a flexing member formed of an elongated elastic material and connected at its both ends to said outer end portions of said lever member under the condition where a central portion thereof is flexed.

2. The stacked piezoelectric ceramics displacement magnifying device as defined in claim 1, wherein said flexing member is formed of a thin sheet steel.

3. The stacked piezoelectric ceramics displacement magnifying device as defined in claim 1, wherein said flexing member is formed of a metal wire.

4. A stacked piezoelectric ceramics displacement magnifying device comprising;
    a base member;
    a stacked piezoelectric ceramics fixed at its one end to said base member, said stacked piezoelectric ceramics being expandable upon application of an electric field thereto;
    a pair of lever members arranged in symmetrical relationship with respect to said stacked piezoelectric ceramics, each of said pair of lever members having an inner end portion for receiving an expansion force from said stacked piezoelectric ceramics, and outer end portion adapted to be outwardly displaced when said inner end portion receives said expansion force from said stacked piezoelectric ceramics, and a fulcrum portion connected to said base member through a first hinge intergrally formed with said lever member and said base member, said first hinge being formed of a thin plate unexpandable in its longitudinal direction and being arranged in parallel to a direction of a resultant of forces acting to said inner end portion and said outer end portion of said lever member;
    a connection member for connecting the other end of said stacked piezoelectric ceramics to said inner end portion of said lever member through a second hinge integrally formed with said connection member and said lever member; and
    a flexing member formed of an elongated elastic material and connected at its both ends to said outer end portions of said pair of lever members under the condition where a central portion thereof is flexed outwardly.

5. The stacked piezoelectric ceramics displacement magnifying device as defined in claim 4, wherein said flexing member is formed of a thin sheet metal.

6. The stacked piezoelectric ceramics displacement magnifying device as defined in claim 4, wherein said flexing member is formed of a metal wire.

* * * * *